United States Patent [19]

Antunez

[11] 4,420,845
[45] Dec. 20, 1983

[54] FLOAT VALVE ASSEMBLY WITH FLOW CONTROL AND VOLUME BALANCING MEANS

[76] Inventor: Bruce A. Antunez, 2153 Iron Club Dr., La Verne, Calif. 91750

[21] Appl. No.: 353,819

[22] Filed: Mar. 2, 1982

[51] Int. Cl.³ .................. F16K 31/26; F16K 47/08
[52] U.S. Cl. .................................... 4/366; 4/661; 137/216; 137/312; 137/410; 137/437; 137/441; 137/444; 137/592; 138/45; 251/120; 285/14
[58] Field of Search .............. 4/366, 508, 661; 137/216, 216.1, 217, 312, 410, 436, 437, 441, 444, 450, 592; 138/44, 45; 251/120; 285/13, 14, 45

[56] References Cited

U.S. PATENT DOCUMENTS

| 1,670,324 | 5/1928 | Teahen et al | 4/331 |
|---|---|---|---|
| 1,998,861 | 4/1935 | Campus | 137/216 |
| 2,195,797 | 4/1940 | Groeniger | 137/592 |
| 2,635,622 | 4/1953 | Owens | 137/437 |
| 2,706,998 | 4/1955 | Bletcher et al. | 137/436 |
| 2,791,235 | 5/1957 | Smith | 137/437 |
| 2,891,578 | 6/1959 | Dahl et al. | 138/45 |
| 2,971,525 | 2/1961 | Antunez, Jr. | 137/444 |
| 3,066,691 | 12/1962 | Lengyel | 137/441 |
| 3,516,094 | 6/1970 | Reagan | 137/217 |
| 3,930,516 | 1/1976 | Flinner et al. | 137/436 |
| 4,318,194 | 3/1982 | Pinkston | 137/410 |

Primary Examiner—George L. Walton
Attorney, Agent, or Firm—Donald D. Mon

[57] ABSTRACT

A valving system capable of maintaining a substantial flow rate to a low profile toilet bowl during bowl wash, bowl flush and refill, and storage tank refill. The system includes a tank refill tube and a bowl wash tube, with an adjustable restriction in one of them to balance the flow between them. When the toilet is flushed, water from the storage tank is emptied into the toilet bowl, causing the bowl contents to start to siphon out. A level-responsive valve opens when the tank level lowers, and supplies water both to the tank to refill it, and to the rim. It flows from the rim to wash the walls, to continue the flush, and to refill the bowl. A flow control can usefully be placed upstream from the valve so that a substantially constant flow rate results which is able to be accurately divided between the tank and the bowl, so that all functions are completed by the time the tank is refilled.

14 Claims, 7 Drawing Figures

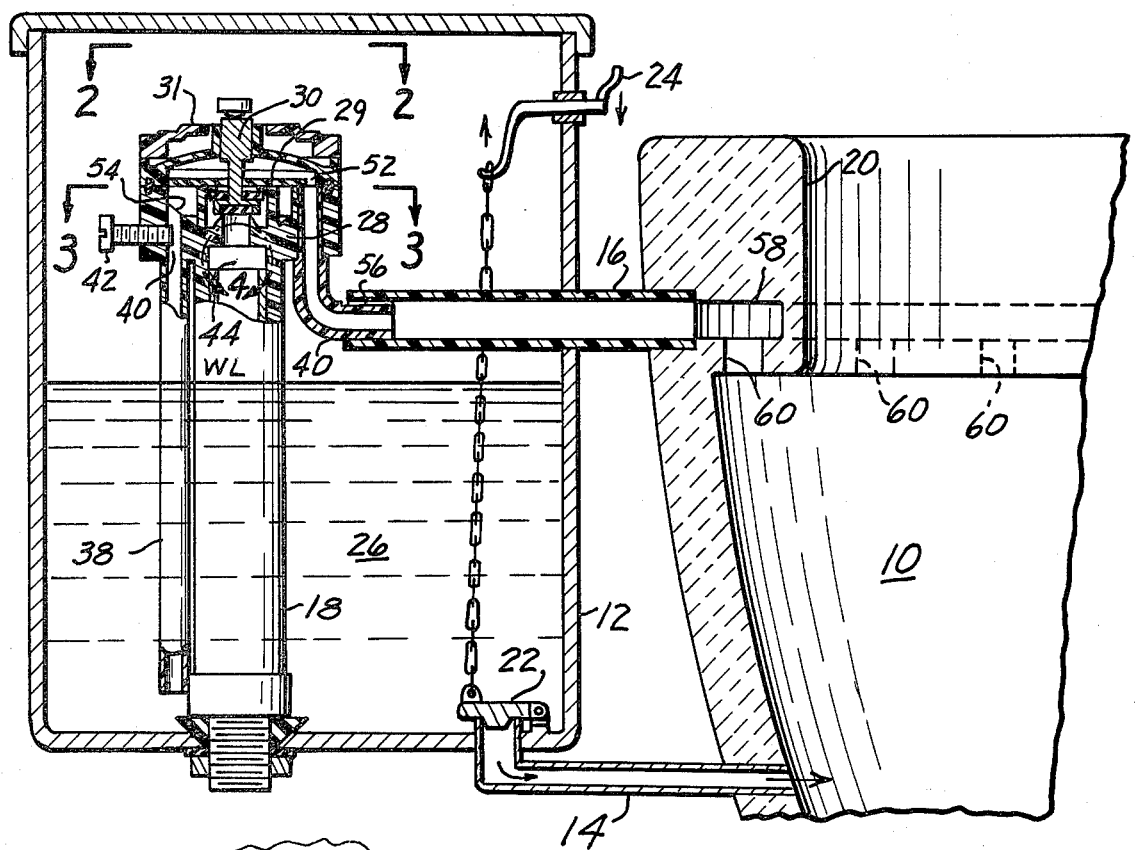
FIG. 1
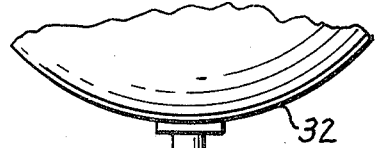
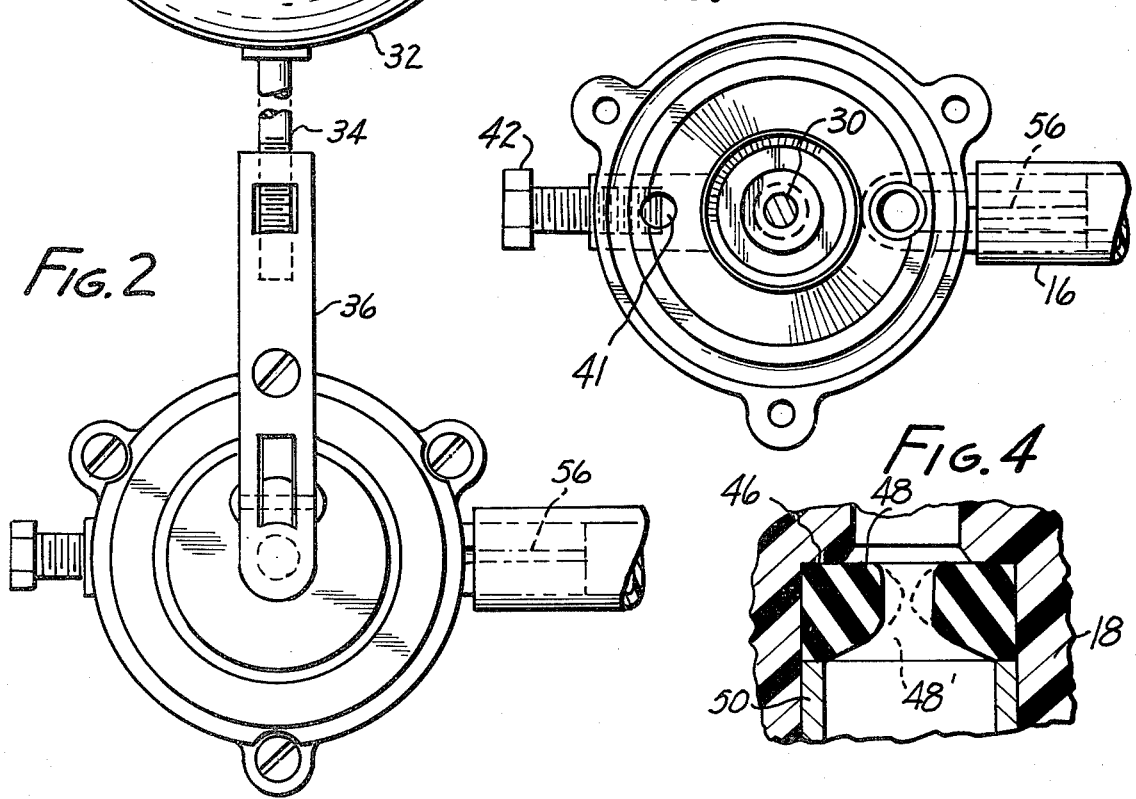
FIG. 2
FIG. 3
FIG. 4

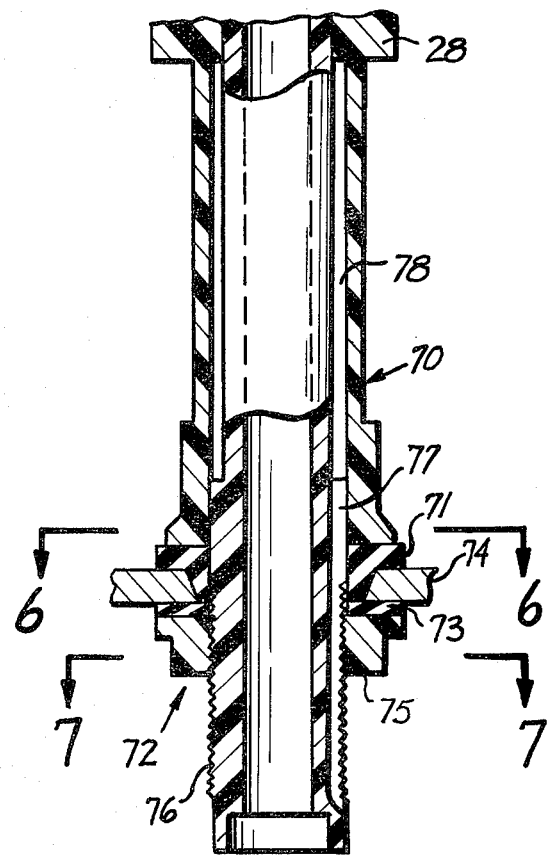
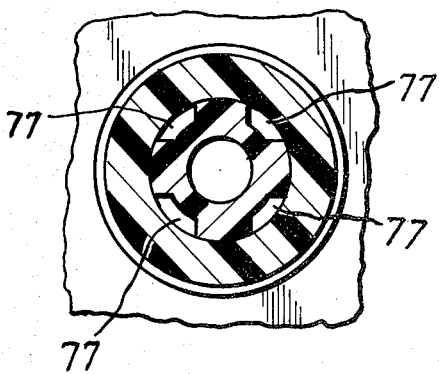
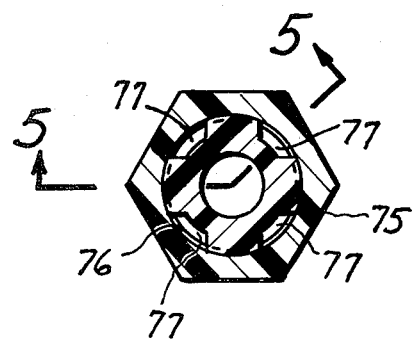

FLOAT VALVE ASSEMBLY WITH FLOW CONTROL AND VOLUME BALANCING MEANS

FIELD OF THE INVENTION

This invention relates to toilet valves and valving systems, and more particularly relates to a system for use with low profile toilet bowls.

BACKGROUND OF THE INVENTION

In low profile toilet bowls the flush sequence generally involves the direct flow of water from the water supply line to the rim of the bowl in order to wash down the toilet bowl, continue the flush of the toilet, and refill the bowl to make a gas seal. This is because a storage tank, which is dumped downstream (separately) of the rim to initiate flushing of the toilet bowl does not usually have a sufficient capacity to make a complete flush. To correct this situation in low profile systems, the additional bowl supply is provided. After the storage tank is dumped, the flush valve closes and the tank begins to refill. However, the toilet bowl continues to flush due to the flow of water directly to the rim of the bowl and from the rim into the bowl. It is necessary to keep a sufficient volume of water flowing to the bowl to maintain the bowl-siphoning action until the bowl is properly flushed, and then to fill it enough to make a gas seal. If the tank fills too soon, relative to what is happening in the bowl, then the bowl flushing may be terminated too soon and be incomplete.

An object of this invention is to provide a valve and valving system having flow balancing means to enable a proper proportioning of the two flow paths from the valve so that all functions of the toilet are properly accomplished and completed.

An optional object is to provide a vented sheath to prevent back-siphoning of water from the tank into the supply line in the event the supply line breaks at certain elevations.

BRIEF DESCRIPTION OF THE INVENTION

The purposes of the present invention are accomplished by means of a balancing valve to balance the volume of flow to the toilet bowl and to the storage tank. A level-responsive valve is conventionally mounted in the storage tank and has a line connecting the valve directly to the rim of the toilet bowl. In addition, another line is provided for refilling the storage tank.

When the flush valve is opened, water from the tank is dumped directly into the bowl. As a consequence, the tank water level drops and the level responsive valve is opened. The valve then supplies water directly to the rim of the toilet bowl through a bowl wash line as well as through the refill line to the storage tank. In order to balance the flow of water to the toilet bowl to wash, to flush, and to refill it, while simultaneously filling the tank, an adjustable restriction is provided, preferably in the form of an adjustable gate valve or a variably adjustable screw which adjustably varies the rate of flow through the refill line or bowl wash line.

According to a preferred but optional feature of the invention, a flow control keeps the total flow at a substantially constant rate regardless of pressure variations, so that the variable restriction can accurately balance the flow between that supplied to the rim of the toilet bowl and that supplied to the tank.

According to still another preferred but optional feature of the invention, the float valve assembly can also include means to prevent siphoning of the storage tank into the rim wash flow directly from the supply line. This is accomplished by providing an elbow insert which may be inserted into the valve seat housing to provide a higher elevation at its input port than the tank refill tube. Additionally, the elbow insert may have a horizontal portion which includes a gap between the tube connecting the float valve assembly to the toilet bowl. This gap opens the float valve to ambient atmosphere and breaks any siphoning vacuum.

According to yet another preferred but optional feature of the invention, a sheath is formed around the supply line to the valve, the interior of the sheath being vented so as to drain water which might enter it out of the tank.

The above and other features of the invention will be fully understood from the following detailed description and the accompanying drawings; in which:

BRIEF DESCRIPTION OF THE DRAWINGS

FIG. 1 is a sectional view illustrating the presently preferred float valve assembly and flushing system according to the invention;

FIG. 2 is a top view of the float valve assembly taken at 2—2 in FIG. 1;

FIG. 3 is a sectional view of the float valve assembly taken at line 3—3 in FIG. 1, with the cap removed;

FIG. 4 is a partial section in detail illustrating pressure sensitive flow control means according to the invention;

FIG. 5 is a partial axial section showing an optional sheath; and

FIGS. 6 and 7 are cross-sections taken at lines 6—6 and 7—7 in FIG. 5.

DETAILED DESCRIPTION OF THE INVENTION

A system for flushing a low profile toilet bowl 10 is illustrated in FIG. 1. Bowl 10 receives water from a storage tank 12 through flush line 14 and also from a level responsive valve through bowl wash line 16. Bowl wash line 16 provides a direct flow from water supply 18 to the rim 20 of the bowl 10 for washing down the bowl walls, continuing the flush, and refilling the bowl. Flushing is initiated by opening a conventional flush valve 22 operated by handle 24 to release the water 26 that is stored in storage tank 12.

Details of a suitable level responsive valve 27 can be seen in FIGS. 1—4. It is used as a control for controlling flow directly to the tank and to bowl wash line 16. Valve 27 has a valve seat housing 28 and a conventional off-on valve 30 operated by a float 32 that is connected by arm 34 to lever 36. Release of water from storage tank 12 causes float 32 to lower and open valve 30.

When valve 27 is opened, water from supply line 18 flows through valve housing 28 and valve 30 to a groove 37, and thence to tank refill line 38 and bowl wash line 16. The flow of water through the wash line 16 and the tank refill line 38 is proportioned by means of a restriction 41 which is adjusted by means such as a gate valve or a screw 42. This balances the flow between tank refill tube 38 and wash line 16, so that washing, flushing and refilling of toilet bowl 10 continue while the tank refills, and for a sufficient period of time that these functions are completed before the tank is refilled. When the tank is refilled, the other functions are terminated, because the valve is closed. By the time the storage tank is refilled to the water line (WL) on supply pipe 18, the toilet bowl 10 should be filled to the appropriate height.

If the water supply pressure is expected to vary substantially, then from time to time it might occur that the functions might not all be completed before the tank is filled even if the valve is properly adjusted at some pressure or rate of flow. This can be avoided by the optional use of a "flow control" whose purpose is to maintain a constant flow rate to the valve. The rate of flow of supply water through the valve seat housing 28 and valve 30 is kept constant regardless of the water pressure, so that once the flow is balanced by the adjustment of restriction 40 no further adjustments will be necessary, and the functions are not unduly sensitive to pressure variations. A suitable flow control device 44 is shown in detail in FIG. 1. The supply pipe 18 is provided with a shoulder 46 against which a deformable grommet 48 is held in place by a retainer 50. The deformable grommet 48 is shown undeformed as it would be at lower pressures. At higher pressures, the grommet 48 deforms to a shape similar to that shown at 48', narrowing the inlet to the valve seat housing 28, and thus maintaining a nearly identical rate of flow through a smaller orifice at a higher inlet pressure.

Means is provided to prevent siphoning from the storage tank 12 into the wash line 16. One means is to provide bend 52 of wash line 16 as an insertable elbow 40 whose uppermost open end is at an elevation higher than the end 54 of tank refill tube 38. With the flow of water balanced between the wash line 16 and the tank refill tube 38, no water can be siphoned from the tank when the valve 30 is opened.

Another means is the provision of an air gap in the form of a groove 56 in the upper portion of the outer wall of insert elbow 40. This communicates the atmosphere with the inside of tube 16. Thus, when wash line tube 16 is installed on the insertable elbow 40, the interior of the insertable elbow and the groove are open to ambient air which will break any siphoning vacuum.

In operation, tripping flush handle 24 opens flush valve 22, releasing stored water 26 from tank 12 into toilet bowl 10 separately from and downstream of the rim 20. This allows float 32 to lower, taking lever 36 with it, allowing valve 30 to open. This causes diaphragm 29 to abut float valve cap 31. Supply water will now flow through the supply line 18, into groove 37 in valve seat housing 28, thence into wash line 16 to the annular channel 58. Water leaves it through a plurality of ports 60. This water washes down the bowl walls, continues the flush, and ultimately fills the bowl enough to form a gas seal. Simultaneously, water flows into end 54 of tank refill line 38 and while the flush valve is open it goes to the bowl to aid in the flush. When the tank 12 is substantially empty, flush valve 22 closes and the refill of the storage tank 12 can start.

When the tank has refilled, float 32 will have been raised high enough to shut off the valve. While valve 22 is open, there is flow both to the tank and to the bowl, and a proper division between them is necessary if the toilet is to function correctly. All supply water flows to groove 37, and the two flow paths diverge from it. The flow between the branches is balanced by adjusting restriction 40 so that when float 32 causes shut off, the toilet bowl air seal will have been re-estblished by refilling the bottom of the toilet bowl, following a complete flush.

A classical anti-siphon means in a tank valve is provided for the purpose of preventing the backflow of water from the tank into the supply line in case there is a break in the water line upstream from the toilet. Thus, it prevents back-siphoning from a toilet bowl on an upper floor of a building when the water line has been broken at a lower floor, or outside in the street. This assumes, of course, that the valve itself, from its own supply line (riser tube) to outlet, remains fluid tight. Otherwise, back siphoning could occur through the broken riser tube. For that matter, a broken riser tube could itself give rise to pollution of the supply, even if the supply line remains under pressure. Therefore there is shown in FIGS. 5–7 a means for additionally protecting the water supply from pollution in the event of breakage of the riser tube.

In FIG. 5, a tubular sheath 70 is shown, extending between the housing 28 of the valve and a seal 71 that forms part of an attachment fitting 72. Fitting 72 includes a washer 75 threaded onto a thread 76 on the bottom of the supply tube. The supply tube is thicker near its bottom so it can accommodate four slots 77 in its outer surface which extend from the annular chamber 78 formed between the supply tube and the sheath to a region below the nut. In case of breakage of the supply tube, leakage water will not enter the tank, nor can tank water return to the supply tube. Instead it will drain on the floor. Water on the floor is not particularly desirable, but compared to public health hazards, it may sometimes be preferable.

The terms "riser tube" and "water supply line" are sometimes used to describe supply tube 18.

While a ball cock valve with a pivoted arm carrying a float is used as an example of a suitable valve, any other valve that is responsive to water level and enables the adjustment of flow control between two outlet passages may be used instead, and for this reason what is shown as a float valve is more generally referred to as a "level responsive valve". Also the sheath may be used for valves which do not provide the flow division feature.

It is to be understood that the flow balancing means can be placed in either the tank refill or the bowl wash line.

Thus, there has been described a novel float valve assembly in which water flows in balanced flow to the rim and bowl of a low profile toilet system, and to a storage tank, and preferably at a reasonably constant rate. Also there has been described a useful sheath feature.

This invention is not to be limited by the embodiments shown in the drawings and described in the description, which are given by way of example and not of limitation, but only in accordance with the scope of the appended claims.

I claim:

1. A valving system for a toilet installation that includes a storage tank, a toilet bowl, and a conduit with a flush valve discharging from the tank to the bowl, said toilet bowl having a wall to be washed, and a rim above said walls, said system comprising: a water level-responsive valve adapted to be mounted in said tank said valve having an inlet and an outlet; a supply line connected to the inlet of said valve to supply water to it under pressure; a tank refill line for discharging from said valve into the tank; a bowl wash line for discharging to said rim, said tank refill line and bowl wash line being directly connected to the outlet of said valve so that both always simultaneously receive water from said level responsive valve; whenever said valve is open to flow and adjustable flow proportioning means in at least one of said tank refill line and said bowl wash line to proportion to flow between them, said flow proportioning means being disposed at a location such that both lines always simultaneously receive water under pressure when said valve is open to flow and regardless to the rate of flow of the water from said valve, and said storage tank will be refilled at a rate which assures simultaneous flushing of the bowl, rinsing of the bowl, and the making of a gas seal, all before the storage tank is refilled to a level where the level responsive valve shuts off.

2. A system according to claim 1 in which a flow control means is placed in said supply line upstream from said level-responsive valve, said flow control comprising pressure responsive restriction means which restricts the rate of water flow inversely as to pressure.

3. A system according to claim 2 in which said pressure responsive restriction means comprises a deformable grommet in said water supply line.

4. A system according to claim 1 in which said level-responsive valve includes a body having a horizontal groove therein, said refill line and said bowl wash line departing from said groove.

5. A system according to claim 4 in which said flow proportioning means comprises a variable restriction.

6. A system according to claim 5 in which said variable restriction comprises a gate valve.

7. A system according to claim 5 in which said variable restriction comprises an adjustable screw adapted to vary the cross-section of the respective line.

8. A system according to claim 4 in which said bowl wash line enters said groove at a higher elevation than the elevation at which tank refill line departs from it.

9. A system according to claim 8 in which said bowl wash line includes air vent means which permits entry of air into it and thence into said groove.

10. A system according to claim 9 in which said air vent means comprises a groove in one of a pair of overlapping tubes.

11. A system according to claim 4 in which said level responsive valve includes a body, a plug, and a seat, said plug being movably mounted to said body by a flexible member attached at its edge to said body, and being movable by level responsive means.

12. A system according to claim 11 in which a float controls said level responsive means.

13. A system according to claim 1 in which a sheath surrounds said water supply line and isolates it from water in said tank, said sheath and supply line forming a chamber between them, said chamber being open to atmosphere below said tank.

14. A system according to claim 13 in which attachment means is provided to attach said valve to said tank, said attachment means comprising an external thread on said water supply line, and a nut threadable to said external thread, and channel means extending axially across and into said external thread adjacent to the inlet end of said water supply line, thereby venting said chamber to atmosphere.

* * * * *